No. 607,346. Patented July 12, 1898.
J. T. CRAW.
PAPER PLANT BOX.
(Application filed Mar. 31, 1898.)
(No Model.)

WITNESSES:
William P. Goebel
J. Fred Acker

INVENTOR
J. T. Craw
BY
ATTORNEYS.

THE NORRIS PETERS CO., PHOTO-LITHO., WASHINGTON, D. C.

UNITED STATES PATENT OFFICE.

JOSEPH T. CRAW, OF JERSEY CITY, NEW JERSEY, ASSIGNOR OF ONE-HALF TO THE BROWN & BAILEY COMPANY, OF PHILADELPHIA, PENNSYLVANIA.

PAPER PLANT-BOX.

SPECIFICATION forming part of Letters Patent No. 607,346, dated July 12, 1898.

Application filed March 31, 1898. Serial No. 675,889. (No model.)

*To all whom it may concern:*

Be it known that I, JOSEPH T. CRAW, of Jersey City, in the county of Hudson and State of New Jersey, have invented a new and Improved Paper Plant-Box, of which the following is a full, clear, and exact description.

The object of my invention is to provide a plant-box made of paper, in which seedlings may be grown and young plants reared, and to construct the plant-box in the shape of a parallelogram, whereby the boxes may be compactly placed upon a growing-table or in a cold frame, and whereby, further, the roots of the growing plants may be spread to a great extent within the boxes, adding materially to the strength of the plants. The square form of the plant-box also enables the young plants to be more economically and securely packed for transportation than when the tapering form of pot or box is employed.

A further object of the invention is to so fold the bottom portion of the plant-box that an opening for drainage will be provided and whereby the bottom of the box may be expeditiously and conveniently pulled open by any one of ordinary intelligence, enabling the boxes and the plants they contain to be placed in the ground when transplanting, the roots remaining undisturbed during the operation and the boxes not interfering in the least with the growth of the plants; on the contrary, serving to facilitate the growth of said plants by reason of the fertilizing material applied to the boxes.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
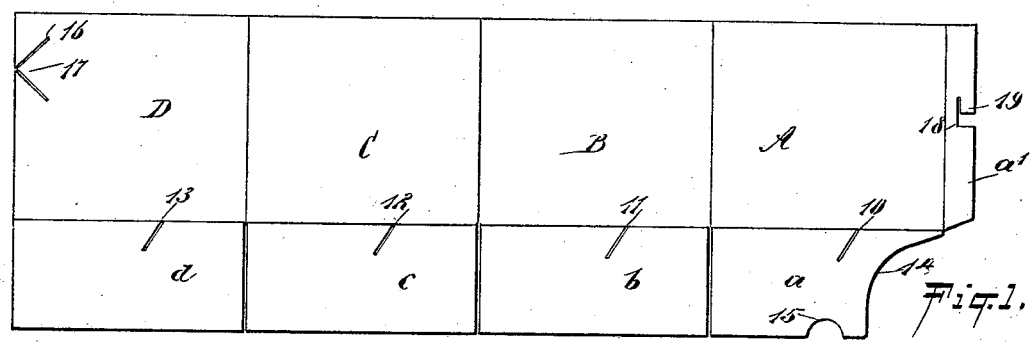
Figure 2:
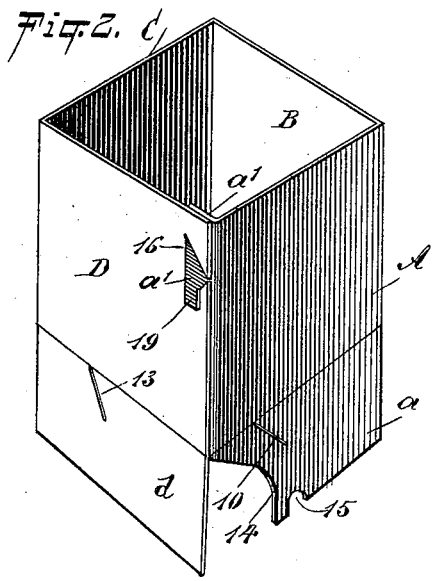
Figure 3:
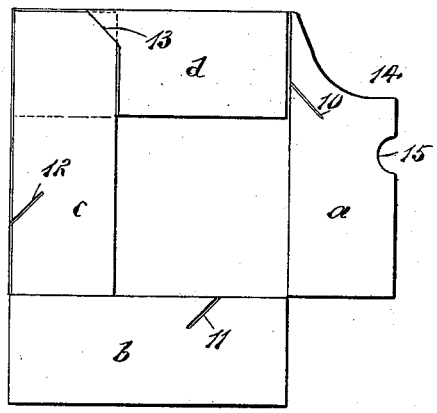
Figure 4:
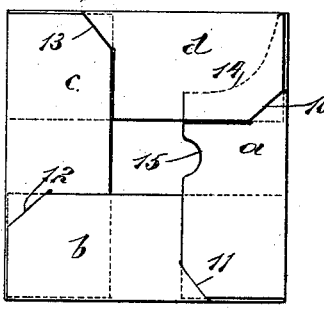
Figure 5:
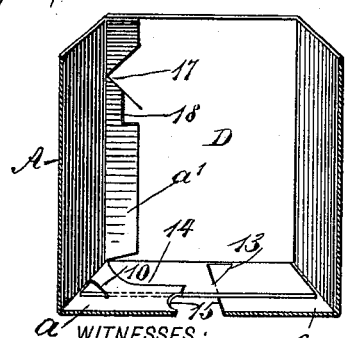
Figure 6:
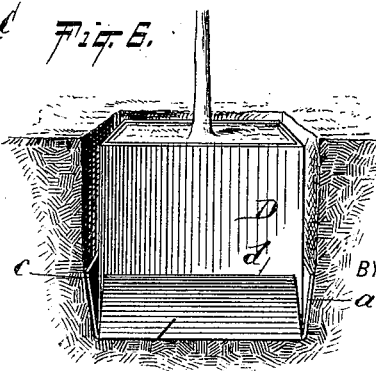

Figure 1 is a plan view of the blank from which the box is made. Fig. 2 is a perspective view of the box, showing the body portion as completely formed. Fig. 3 is a bottom plan view of the box, illustrating portions of the flaps carried in position at the bottom of the box and others of the flaps as ready to be placed in position. Fig. 4 is a bottom plan view of the completely-folded box. Fig. 5 is a vertical section through the complete box; and Fig. 6 is a perspective view of the complete box, illustrating the manner in which the box is planted with the plant.

The blank shown in Fig. 1 is composed of four panels, designated, respectively, as A, B, C, and D, the panels being in the shape of a parallelogram. The panel A, which is one of the end panels in the blank, is provided at its lower edge with a bottom flap $a$ and at its outer vertical edge with a sealing-flap $a'$. The panel B is provided with a bottom flap $b$ at its lower edge, and the panels C and D are similarly provided with bottom flaps, designated, respectively, as $c$ and $d$.

A diagonal slot is produced in each bottom flap, preferably where the bottom flaps connect with the body-panels and at or near the longitudinal center of the bottom flaps. The slots are designated, respectively, as 10, 11, 12, and 13, the slot 10 being in the bottom flap $a$ and the slot 13 in the bottom flap $d$. At the outer end of the bottom flap $a$ a recess 14 is made, extending from the upper edge to the bottom edge or from one longitudinal edge to the other, the recess being usually of concave form, and a semicircular and smaller recess 15 is made, preferably, in the lower longitudinal edge of the said bottom flap $a$. At or near the top of the end body-panel D an angular or A slot 16 is produced, the slot being usually near the upper edge of the panel D and is made to extend through its outer longitudinal edge, forming thereby a triangular tongue 17. In the corresponding end of the opposite body-panel A an L-slot 18 is made, which is lower down than the slot 16, the L-slot producing a tongue 19, which may be much longer than shown in the blank, if desired.

The end panels of the body of the box may be connected by stitching, for example, or wire staples may be employed, or the end body-panels of the blank may have an interlocking connection, as shown in Fig. 2. When the end panels of the box are to be connected by staples, the tongues 17 and 19 and the slots 16 and 18 are omitted from the blank.

In forming the box-body the end or body flap $a'$ is bent upon its score-line to stand at an angle to the panel A, as is particularly shown in Figs. 2 and 5. Each panel is then bent upon the score-line dividing it from the next, and the various body-panels are brought into position to produce a figure representing a parallelogram, as shown in Fig. 2. After the various panels have been brought to position the side flap $a'$ will engage with the inner face of the body-panel D, and the tongue 17 is carried back of the side flap $a'$, and thence outward in direction of the body-panel A. Next the panel D is slipped upward until the tongue 19 on the flap $a'$ shall have passed over a side edge of the slot 16 in the panel D, which slot forms the aforesaid triangular tongue 17. When the body of the box is made up in this manner, the blanks may be shipped flat to purchasers and expeditiously and conveniently set up by them.

In the formation of the bottom of the box the flap $d$ is carried inward at a right angle to the panel D to which it belongs, as shown in Fig. 3. The flap $c$ is then carried inward from the body-panel C and over an end portion of the flap $d$, a corner of the flap $c$ being made to enter the slot 13 in the bottom flap $d$. The flap $b$ is then carried over upon the flap $c$, and a corner of the flap $b$ is made to enter the slot 12 in the flap $c$, as shown in Fig. 4. Finally the flap $a$ is carried over upon the flap $b$ and beneath the opposing flap $d$, and a corner of the flap $a$ is then entered into the slot 11 of the flap $b$, and a corner of the flap $d$ is made to enter the slot 10 in the flap $a$. Thus it will be observed that a central drainage-opening is provided and the bottom of the box is rendered exceedingly stiff, yet the construction of the bottom is very simple and economic.

After a plant is in the box and said plant is to be transplanted the box need not be turned bottom upward to shake out the plant or to ascertain how to disconnect the parts of the bottom, it simply being necessary to introduce a finger in the recess 15 of the flap $a$ and draw the said flap downward, repeating the operation with reference to the opposing bottom flap $c$. The flaps will now stand straight down, as shown in Fig. 2. The flaps are then bent upward along the outside of the body of the box and the box, together with the plant and the earth it contains, are introduced into the ground. Thus it will be observed that the earth around the plant need not be disturbed, nor the roots of the plant. Thus the plant is given no setback, but will have an uninterrupted growth.

A fertilizing material may be worked up with the stock from which the blank is to be made; but usually the inner face of the blank is completely coated with a liquid fertilizer which dries upon its surface. This fertilizing material is of great benefit to the plant and facilitates its growth.

A plant-box of the construction above set forth is particularly adapted for the purpose to which it is to be applied, since the boxes may be packed close together on a growing-table or in a cold frame and no space is lost. The roots of the plants may spread much more than in a pot or box of tapering form, and consequently the plants will be hardier, and in transportation the boxes containing the plants may be packed together to form a square parcel, and one will act as a support to the others, and consequently the dirt will not be disturbed around the roots. Even if a single box is shipped its rectangular shape preserves the plant against bad usage to a great extent.

Having thus described my invention, I claim as new and desire to secure by Letters Patent—

1. In a paper plant-box, a blank comprising a series of panels of the shape of a parallelogram, one of the end panels being provided with a side flap, and all of the said panels being provided with rectangular flaps at their lower edges, each of the said bottom flaps being provided with a diagonal slot between its ends, for the purpose specified.

2. In paper plant-boxes, a blank consisting of a series of body-panels having the shape of a parallelogram, each body-panel being provided with a bottom flap at its lower edge and one of the side panels being provided with a vertical flap at its outer edge, the said vertical flap being provided with an angular slot at its edge, forming a tongue, the opposite end panel of the body being provided with an angular slot producing a triangular tongue, each of the bottom flaps having a diagonal slot made therein, all of the slots having the same inclination, and the bottom flap of one of the end panels being provided with recessed edges, for the purpose set forth.

3. A rectangular paper plant-box, the bottom whereof consists of flaps extending from the lower edges of the body-panels, each of the said bottom flaps being provided with a diagonal slot arranged to receive the corner portion of an adjacent overlapping flap, a drainage-opening being provided at the central portion of the body and bounded by the bottom flaps, for the purpose set forth.

JOSEPH T. CRAW.

Witnesses:
J. FRED. ACKER,
EVERARD BOLTON MARSHALL.